(12) United States Patent
Kolczyk et al.

(10) Patent No.: US 8,105,485 B2
(45) Date of Patent: *Jan. 31, 2012

(54) FILTERING SYSTEM, IN PARTICULAR FOR FILTERING LIQUIDS IN INTERNAL COMBUSTION ENGINES

(75) Inventors: Markus Kolczyk, Mundelsheim (DE); Dieter Amesöder, Bietigheim-Bissingen (DE); Sven Epli, Heilbronn (DE); Michael Thienel, Kasendorf (DE); Michael Wein, Stuttgart (DE); Luiz Carlos Fritz, Sao Paulo (BR); Dieter Schreckenberger, Marbach (DE); Marco Woitoll, Schwieberdingen (DE); Thomas Petschl, Ludwigsburg (DE); Matthias Teschner, Ludwigsburg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 746 days.

This patent is subject to a terminal disclaimer.

(21) Appl. No.: 11/914,237

(22) PCT Filed: May 12, 2006

(86) PCT No.: PCT/EP2006/062267
§ 371 (c)(1),
(2), (4) Date: Sep. 28, 2008

(87) PCT Pub. No.: WO2006/120243
PCT Pub. Date: Nov. 16, 2006

(65) Prior Publication Data
US 2009/0301949 A1  Dec. 10, 2009

(30) Foreign Application Priority Data

May 13, 2005 (DE) ............... 20 2005 007 871 U

(51) Int. Cl.
*B01D 35/30* (2006.01)
(52) U.S. Cl. .......... 210/130; 55/490; 210/136; 210/420; 210/429; 210/433.1; 210/440; 210/443
(58) Field of Classification Search .......... 210/130, 210/133, 136, 420, 421, 429, 433.1, 434, 210/440, 441, 443–445, 451, 455, 234, 235, 210/437, 438; 55/490
See application file for complete search history.

(56) References Cited

U.S. PATENT DOCUMENTS

| | | | | |
|---|---|---|---|---|
| 3,297,162 A * | 1/1967 | Mouwen | ........................ | 210/132 |
| 3,369,666 A * | 2/1968 | Hultgren et al. | ............. | 210/130 |
| 3,773,180 A * | 11/1973 | Harrison | ....................... | 210/315 |
| 3,807,561 A * | 4/1974 | Cullis | .......................... | 210/130 |
| 5,171,430 A * | 12/1992 | Beach et al. | ..................... | 210/94 |
| 5,667,678 A * | 9/1997 | Dye et al. | ....................... | 210/232 |
| 5,858,227 A | 1/1999 | Stone et al. | | |
| 6,187,191 B1 * | 2/2001 | Koivula et al. | ................. | 210/440 |
| 6,227,381 B1 * | 5/2001 | Koivula | .......................... | 210/440 |
| 2003/0057146 A1 * | 3/2003 | Rickle et al. | ................... | 210/243 |

FOREIGN PATENT DOCUMENTS

| | | |
|---|---|---|
| DE | 8210287 U1 | 10/1982 |
| GB | 2333245 A1 | 7/1999 |
| WO | 97/44113 A1 | 11/1997 |

* cited by examiner

*Primary Examiner* — Joseph Drodge

(57) ABSTRACT

A filtering device for filtering liquids in internal combustion engines has a filter housing and a filter element inserted into the filter housing. A cover disk closes off the filter housing. The cover disk consists of two individual disks and a central flow connection connects the two individual disks. The two individual disks and the flow connection form a common plastic component.

15 Claims, 14 Drawing Sheets

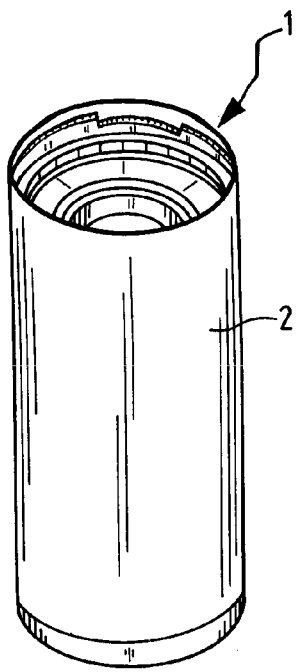
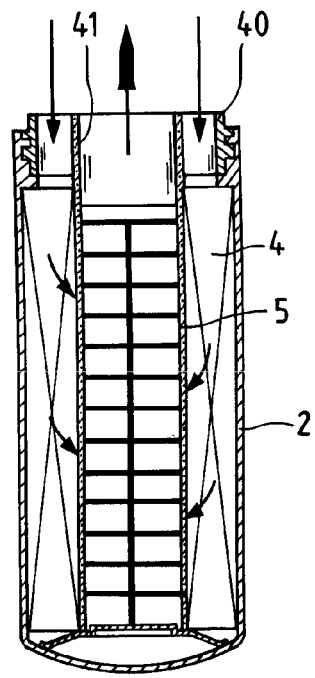
Fig.17     Fig.18
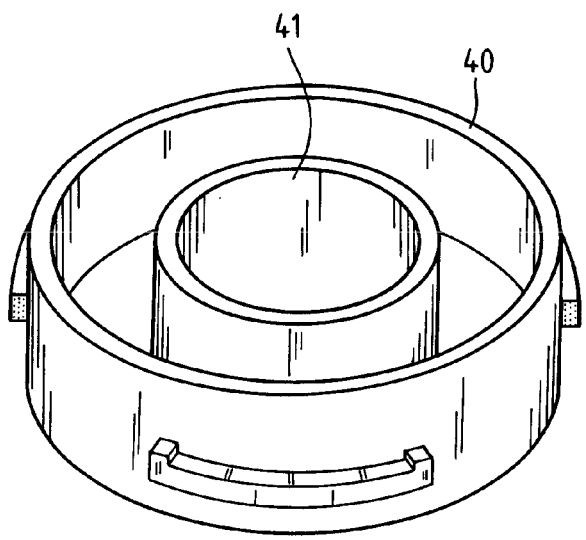
Fig.19

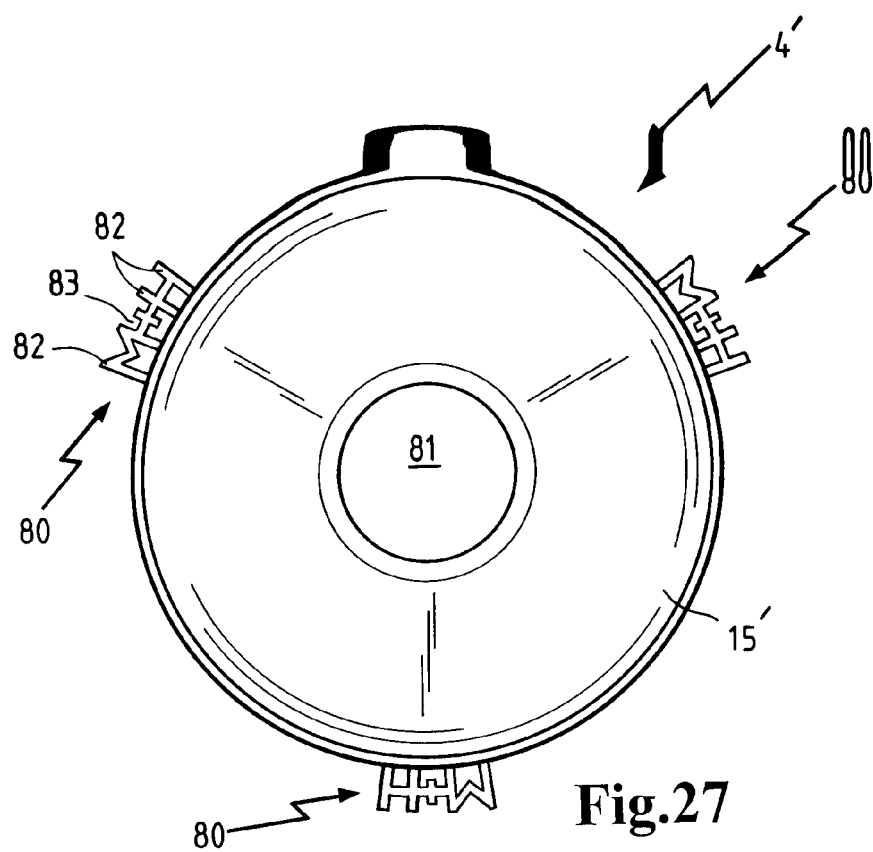
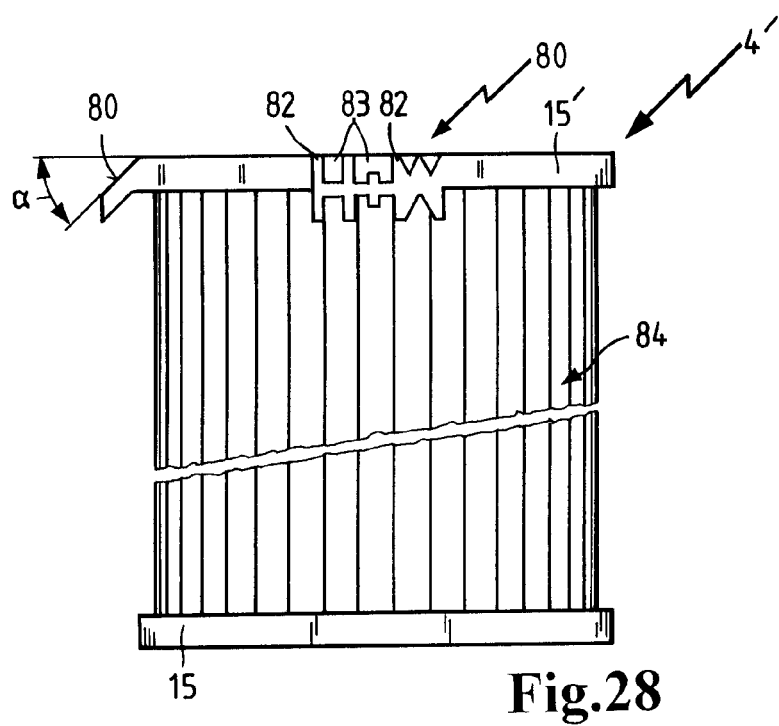

FILTERING SYSTEM, IN PARTICULAR FOR FILTERING LIQUIDS IN INTERNAL COMBUSTION ENGINES

BACKGROUND OF THE INVENTION

The invention relates to a filtering system, in particular for filtering liquids in internal combustion engines with a filter element insertable into a filter housing, the filter housing being closed by a cover disk.

These filtering devices are used in internal combustion engines for filtering oil or fuel and comprise a hollow cylindrical filter element to be flown through radially from outside to inside and which is inserted into a filter housing of the filtering device. The liquid to be filtered is introduced via an inlet into the filter housing in the area of the outside of the filter element forming the entry side and axially discharged via the central hollow space after being filtered. The filter housing has an approximate cup-shaped design for the reception of the filter element and is closed by a cover disk after the insertion of the filter element. This cover disk is typically made of metal in order to ensure the required stability.

The problem addressed by the invention is to develop a filtering device of the generic kind in a stable design and at the same time of low weight. The filtering device should be able to be disposed of conveniently with little effort.

SUMMARY OF THE INVENTION

This problem is solved according to the invention in that the cover disk consists of two individual disks which are connected via a central flow connection, the two individual disks and the flow connection forming a common plastic component.

The filtering device according to the invention which in particular is used for filtering for example oil or fuel in internal combustion engines has a cover disk that is to be placed onto the filter housing and which consists of two parallel individual disks connected via a central flow connection, both individual disks and the flow connection forming a common plastic component. The double-disk design of the cover disk made of plastic has the advantage that compared with the embodiments of prior art at least an equal high stability with low weight is ensured, at the same time the capability for recycling is considerably improved as the cover disk is now also made completely of plastic making it possible to incinerate it after use together with the filter housing made typically also of plastic without any significant environmental impact.

The bipartite cover disk can for example be produced easily as injection molded part, however, other manufacturing processes for plastic parts such as deep drawing can be considered. If required, the cover disk made of plastic can also be used in combination with a metal pot.

The hollow cylindrical flow connection in the cover disk has two functions: on the one hand, the flow connection connects the two individual disks with each other, on the other hand, the liquid can be introduced into or discharged from the filter housing via the interior area of the flow connection. Furthermore and according to an advantageous embodiment, the flow connection can be provided with a female thread by means of which the cover disk or the complete filtering device can be connected to a subassembly of the internal combustion engine. If required, an external thread can also be considered by means of which the connection between the filter and for example a motor flange can be realized. Such an external thread can also consist of a separate insert in the cover that can preferably be injected or clipped as flow connection.

The flow connection between the individual disks may feature a relatively large diameter, making on the one hand the flow through the flow connection easier and increasing on the other hand the stability of the cover disk. In addition to the flow connection it is possible to provide connecting bars which connect both individual disks and are located radially further outside, by means of which the rigidity of the cover disk is considerably increased.

According to a preferred embodiment one of the individual disks forms a front disk directly placed onto the front end of the filter element that can be firmly connected with the front end, for example by means of welding or gluing. The individual disk forming the front disk ensures a flow separation of entry side and clean side of the filter element and enhances the stability of the filter element.

Typically, the central flow connection which connects the two individual disks of the cover disk forms the flow-off connection via which the filtered liquid is axially discharged from the interior area of the filter element that forms the clean side. The supply of the unfiltered liquid is also conveniently realized via the cover disk which for this purpose features in the outside located individual disk facing away from the filter element at least one towards the filter element opening anti-drain valve via which the liquid to be filtered is introduced into the filtering device. This anti-drain valve is in opening position as long as the pressure of the liquid at the entry side in the filtering device is lower than the pressure under which the liquid is introduced into the filtering device. When dismounting the filter element overhead the anti-drain valve prevents the liquid from flowing out or the filter from idling when the motor is stopped.

In a simple embodiment, this anti-drain valve can be designed as duck bill valve that reacts to pressure differences at the inflow and outflow side of the valve and which is automatically switched into locked position if the pressure exceeds a threshold value at the outflow side.

The individual disk of the cover disk adjacent to the filter element conveniently features slotted holes extending in circumferential direction through which the liquid introduced via the anti-drain valve in the exterior individual disk can flow from the space between the two individual disks to the entry side of the filter element. The exterior edge of the individual disk limiting the slotted holes rests on the inner lateral surface of the filter housing which enhances also the stability. If required, the exterior edge is also welded, glued or otherwise connected with the lateral surface.

As an alternative to the slotted holes extending in circumferential direction the peripheral zone of the individual disk directly adjacent to the filter element can feature radially projecting ribs with radially set back recesses through which a through-flow of the introduced liquid to the entry side of the filter element is possible. The projecting ribs rest on the inner lateral surface of the filter housing.

An overflow opening via which the entry side communicates directly with the clean side of the filter element can be realized in the front disk—which is preferably one of the individual disks of the cover disk—located on the axial front end of the filter element. The overflow opening is closed by an overflow valve which under normal conditions is in closed position in order to separate the entry side from the clean side. If the pressure at the entry side exceeds a threshold value, for example as a consequence of a clogged filter element, the overflow valve opens and the overpressure at the entry side is reduced by a direct overflow of the liquid from the entry side to the clean side. Once the overpressure has been reduced, the overflow valve automatically moves into the closing position.

The connecting female thread in the central flow connection via which the filtering device is connected to a subassembly of the internal combustion engine does conveniently not have a sawtooth geometry but an elliptic geometry which considerably reduces the stress load in the thread. This makes it possible—despite using plastic for the cover disk—to introduce relatively strong forces via he thread in the flow connection so that especially the deadweight of the filtering device can be supported by the female thread.

BRIEF DESCRIPTION OF THE DRAWINGS

Further advantages and appropriate embodiments can be taken from the claims, from the description and from the drawings. Shown are in:

The figures show the identical components with the same reference signs.

DESCRIPTION OF THE DRAWINGS

Figure 1:
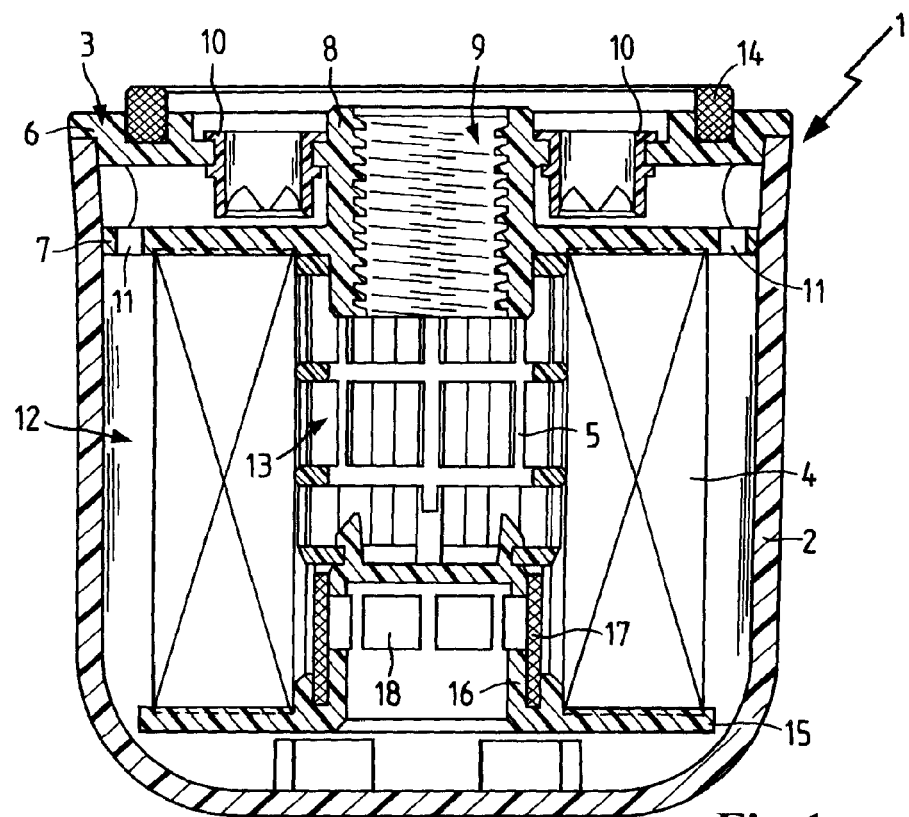
FIG. 1 a section through a filtering device for filtering liquids in an internal combustion engine, with a cup-shaped filter housing, a hollow cylindrical filter element inserted into the filter housing and a bipartite cover disk with two individual disks connected with each other via a flow connection, FIG. 2 the filtering device in a perspective view in a partial section, FIG. 3 the cover disk in a perspective view in a partial section, FIG. 4 a detail in the area of the female thread in the flow connection, with incorporated elliptic geometry of the thread, FIG. 5 a filtering device in another embodiment, shown in a partial section, FIG. 6 a view from above onto the filtering device acc. to FIG. 5, FIG. 7 an enlargement of detail VII in FIG. 5, FIG. 8 an overflow valve designed as duck bill valve in a perspective view, FIG. 9 the duck bill valve in a view from below, FIG. 10 a perspective view of a supporting element for a hollow cylindrical filter element which is at one end placed onto the lower end disk, a fixing or attachment connection being realized on the end disk around which a sealing hose serving as overflow valve is laid, FIG. 11 the lower end disk in a perspective individual view, FIG. 12 the supporting element including lower end disk represented in section, FIG. 13a a perspective view of the lower end disk in a partial section, with an overflow valve in an alternative embodiment, FIG. 13b a view of a similar object as in FIG. 13a, however with an overflow valve in another embodiment, FIG. 14a, b an overflow or bypass valve which is used between entry side and clean side of the filter element and features an elastomer block as valve body that can be elastically compressed, represented in closing position (FIG. 14a) and opening position (FIG. 14b), FIG. 15a, b an overflow or bypass valve with an elastomer bellows as valve body, FIG. 16a, b an overflow or bypass valve with a foam block as valve body, FIG. 17 a perspective view of a filtering device with a cylindrical filter housing and a ring-shaped filter element inserted in it to which the liquid to be filtered is supplied via an anti-drain valve, FIG. 18 a longitudinal section through the filtering device acc. to FIG. 17 including frontally inserted connecting rings, FIG. 19 the individually represented connecting rings, FIG. 20 an enlarged representation of the filtering device from FIG. 17 with the anti-drain valve in locked position designed as hose valve, FIG. 21 a representation acc. to FIG. 20, however with the hose valve being in open position, FIG. 22 a perspective view of another filtering device which features a cover disk with radially extending spokes, FIG. 23 a perspective view of still another filtering device featuring an overflow valve between entry side and clean side which is provided with axially protruding supporting feet, FIG. 24 the overflow valve from FIG. 23 in individual representation, FIG. 25 a supporting ring for the attachment to the axial front end at the overflow valve, FIG. 26 an overflow valve in the cup-shaped filter housing with a mandril arranged at the bottom of the housing which projects into a recess in the overflow valve limited by the valve housing, FIG. 27 a filter element in top view, FIG. 28 the filter element acc. to FIG. 27 in lateral view, FIG. 29 a detail from the filter housing in a perspective view and FIG. 30 the filter element in assembled condition in the filter housing.
Figure 2:
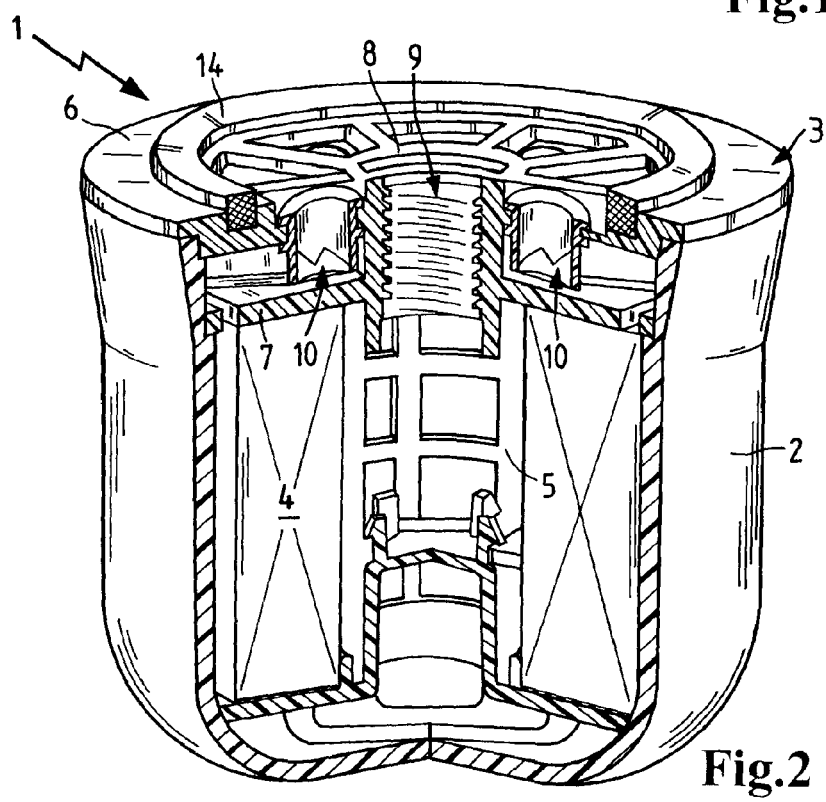

The filtering device 1 represented in FIGS. 1 and 2 is mainly used in internal combustion engines for filtering liquids such as oil or fuel. The filtering device 1 comprises a plastic filter housing 2 which is approximately cup-shaped and closed by a cover disk 3. A filter element 4 is inserted into the receptacle in the filter housing 2 which has a hollow cylindrical design and is supported by a central supporting element 5 made of plastic and arranged in the interior area of the filter element 4. Liquid flows radially through the filter element 4 from outside to inside so that the outside of the filter element 4 forms the entry side 12 and the interior area in the filter element the clean side 13.

The cover disk 3 is made completely of plastic and comprises two individual disks 6 and 7 which are located parallel to each other and feature approximately the same radius and are connected via a central hollow cylindrical flow connection 8. The two individual disks 6 and 7 as well as the flow connection 8 form a common one-piece plastic subassembly which is manufactured for example in injection molding or in other method such as deep drawing. If necessary, additional connecting bars are located in the space between the two parallel individual disks 6 and 7 via which both individual disks are supported against each other and which increase the stability of the cover disk 3 considerably.

The central connecting piece which—as part of the cover disk 3—connects the two individual disks 6 and 7 features a connecting female thread 9 via which the cover disk 3 and therefore the whole filtering device I can be connected to a subassembly of the internal combustion engine. At the same time, the flow connection 8 serves as off-flow opening which communicates with the clean side 13 of the filter element 4 and through which the filtered liquid is axially discharged from the filtering device 1. The flow connection 8 projects axially above the bottom side of the lower disk 7 facing directly the filter element 4 and into the cylindrical interior area of the filter element 4 which is the clean side 13.

The lower individual disk 7 is conveniently connected directly with the front end of the filter element 4 which can for example be obtained by welding or gluing it with the front end of the filter element. In doing so, the lower individual disk 7 forms the front end of the filter element and ensures on the one hand the stability of the filter element and on the other hand a separation of clean and entry side.

Inflow openings are realized in the upper individual disk 6 facing away from the filter element 4 into which the anti-drain valves 10 are inserted. These anti-drain valves 10 are for example designed as duck bill valves which are represented in detail in the FIGS. 8 and 9. At first, the liquid to be filtered is introduced via the anti-drain valves 10 into the space between the two individual disks 6 and 7, the anti-drain valves 10 preventing the liquid from flowing out or the filter from running idle when the motor is stopped during overhead dismounting of the filter element. From the space between the individual disks 6 and 7 liquid flows through flow-through openings 11 in the lower individual disk 7 directly facing the filter element 4 into the entry side 12 which is designed as annular gap between the internal wall of the filter housing 2 and the outside of the filter element 4. After flowing through the filter element 4 in radial direction from outside to inside the filtered liquid is collected in the central cylindrical interior area (clean side 13) and discharged axially through the flow connection 8 of the cover disk 3.

On the upper side of the upper individual disk 6 of the cover disk 3 a gasket 14 is inserted into a location groove intended for this in the individual disk 6. The gasket 14 ensures a flow-tight connection of the filtering device 1 to a subassembly of the internal combustion engine to which the filtering device is connected.

In the lower area of the filtering device facing the bottom of the filter housing 2 the filter element 4 is sealed by a frontal end plate 15. This end plate 15 which is located at the front end of the filter element opposite to the cover disk 3 has a convex cup-shaped fixing connection 16 which projects from below into the clean room 13 of the filter element 4. The outside of the fixing connection 16 projecting above the plane of the end plate 15 is surrounded by a sealing hose 17 which serves as an overflow valve. Into the axially extending walls of the fixing connection 16 are made recesses 18 which are covered by the sealing hose 17 and normally close the recesses 18 flow-tight. However, if the pressure at the entry side 12 exceeds a threshold value and is in particular higher than the pressure at the clean side 13 the filtered liquid flows via the bottom of the filter housing 2 from below into the recess in the fixing connection 16 and has an impact via the recesses 18 onto the inside of the sealing hose 17 by which the sealing hose is radially enlarged and the unfiltered liquid can directly flow from the entry side 12 to the clean side 13 via the recesses 18. If the pressure decreases, the recesses 18 are again closed flow-tight by the internal stress in the sealing hose 17. The sealing hose 17 combines in one subassembly the functions of a valve body and a valve spring that has an impact on the valve body in closing position.

Figure 3:
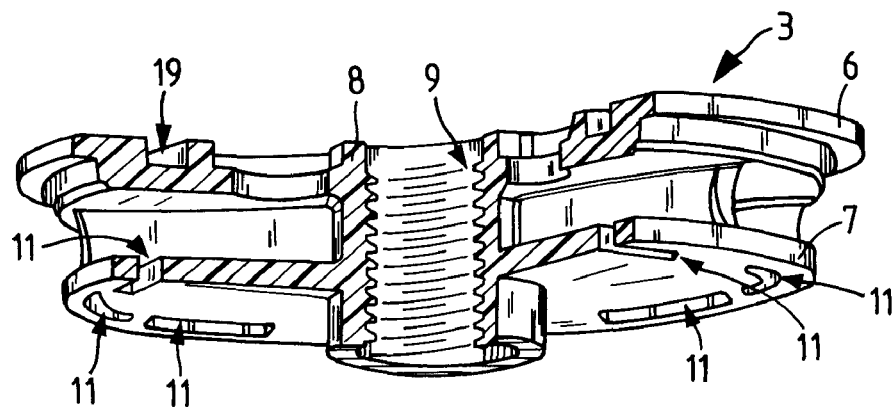

FIG. 3 shows the cover disk 3 in an individual representation. It can be seen that the flow-through openings 11 are designed as slotted holes in the lower individual disk 7 which extend in circumferential direction of the cover disk. The flow-through openings 11 are located in the radially outside laying area of the individual disk 7 and communicate when the cover disk 3 is mounted directly with the entry side 12 of the filter element.

On the upper side of the upper individual disk 6 is the location groove 19 designed as one-piece with the cover disk for the gasket to be inserted.

Figure 4:
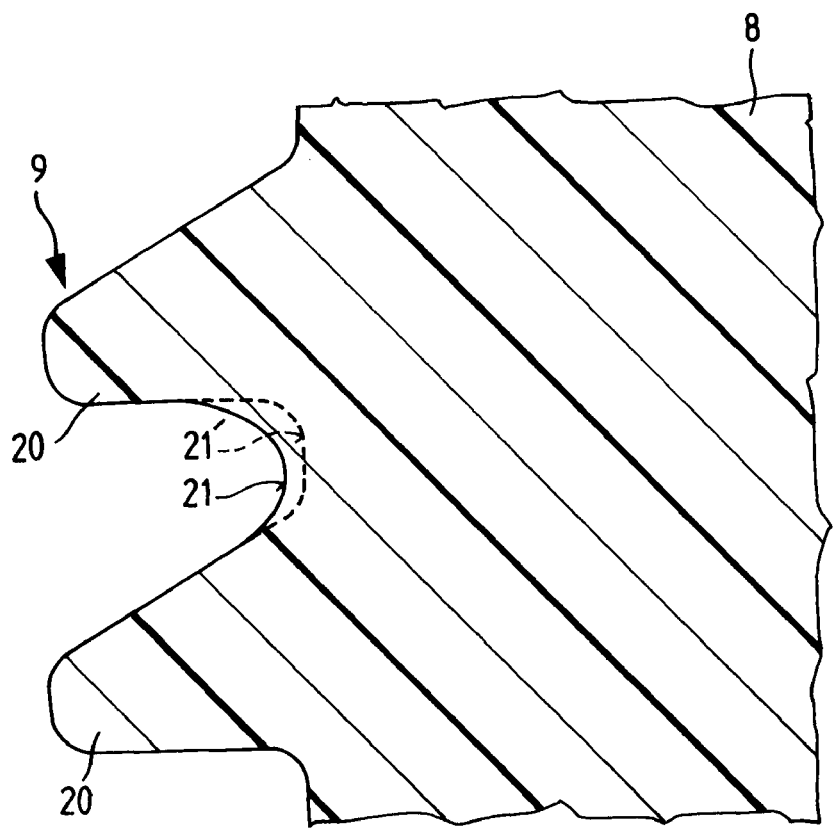

FIG. 4 represents a section in enlarged representation through the connecting female thread 9 in the flow connection 8. The cross-section geometry between two adjacent teeth 20 of the thread is elliptically designed and follows the continuous line 21. For comparison, a conventional sawtooth geometry of prior art is represented in dotted line 21'. The advantages of the elliptic geometry according to the continuous line 21 are the lower tensions which allows the use of relatively soft material such as plastic.

Figure 5:
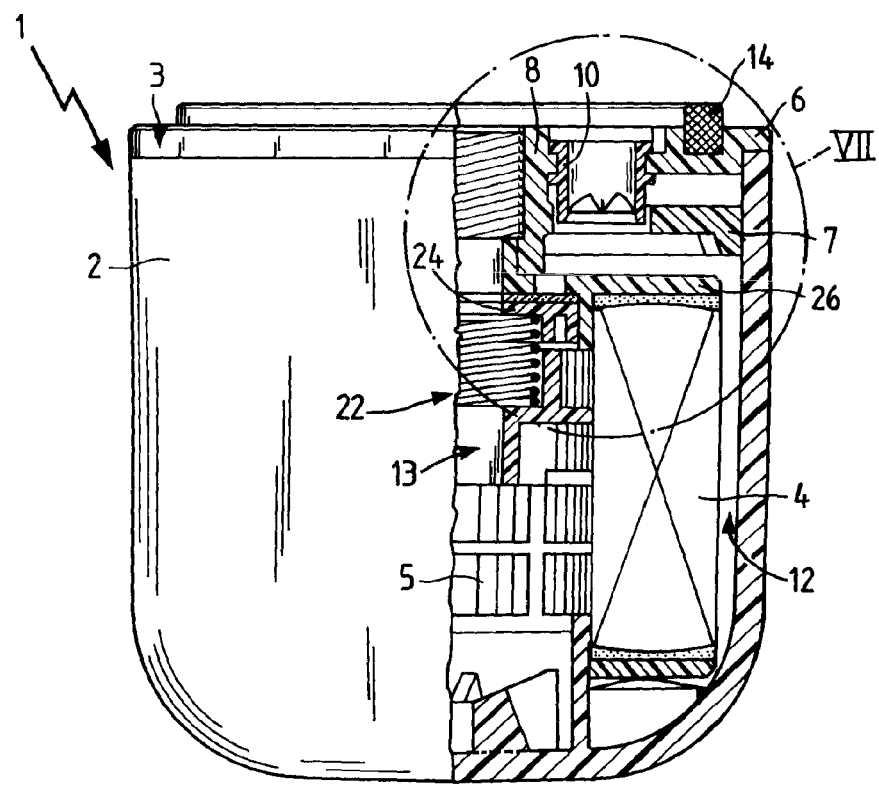
Figure 6:
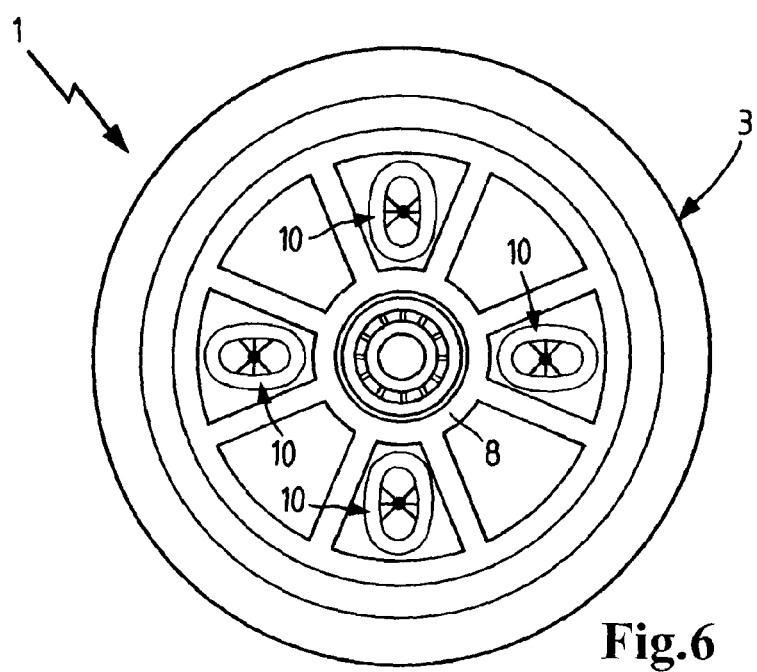
Figure 7:
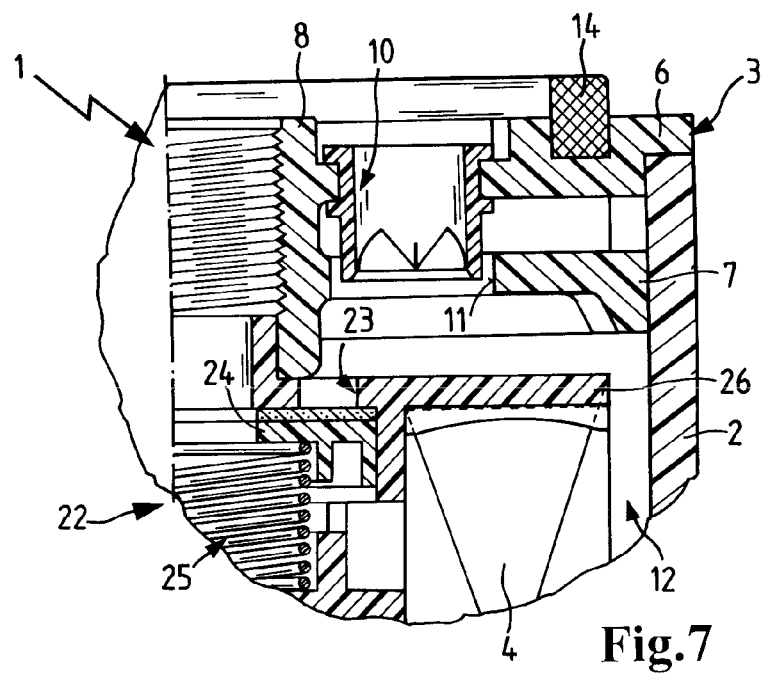

FIGS. 5 to 7 show another example of an embodiment for a filtering device 1 for filtering liquids. The filtering device features an overflow valve 22 in the upper area of the filter element 4 facing the cover disk 3 which—under regular conditions—closes an overflow opening 23 between the entry side 12 and the clean side 13 of the filter element. This overflow opening 23 is realized in a front disk 26 which is firmly connected with the upper front end of the filter element 4. The front disk 26 is designed as separate subassembly independent of the cover disk 3, however, connected with the cover disk. Within the scope of the invention it can also be appropriate to connect the lower individual disk 7 of the cover disk 3 directly with the front end of the filter element 4, in this case the overflow opening 23 would be realized in the individual disk 7. Furthermore, it is possible to design the front disk 26 as a one-piece plastic subassembly with the cover disk 3.

The overflow valve 22 comprises a sealing washer 24 which ensures the function of the valve body and is axially slidably arranged at the clean side 13 of the filter element and receives an impact from a valve spring 25 in its closing position in which the sealing washer 24 sealingly contacts the overflow opening 23 in the front disk 26. The valve spring 25 is supported by the supporting element 5 of the filter element 4.

The liquid to be filtered is introduced via the anti-drain valves 10 into the interior of the filtering device; altogether there are four anti-drain valves 10 arranged in the cover disk 3. If the pressure of the introduced liquid exceeds a threshold value the sealing washer 24 is then shifted axially downwards against the force of the valve spring 25 from its closing position, giving way to a flow path via the overflow opening 23 directly from the entry side 12 to the clean side 13. If the pressure has decreased, the force of the valve spring 25 is again sufficient to shift the sealing washer 24 against the pressure at the entry side 12 upwards into the closing position in which the overflow opening 23 is closed flow-tight. Conveniently, all components of the overflow valve 22 are made of plastic, and in particular the sealing washer 24 and also the valve spring 25.

Figure 8:
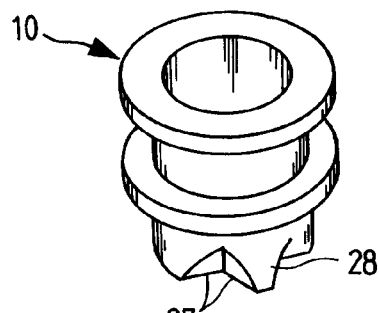
Figure 9:
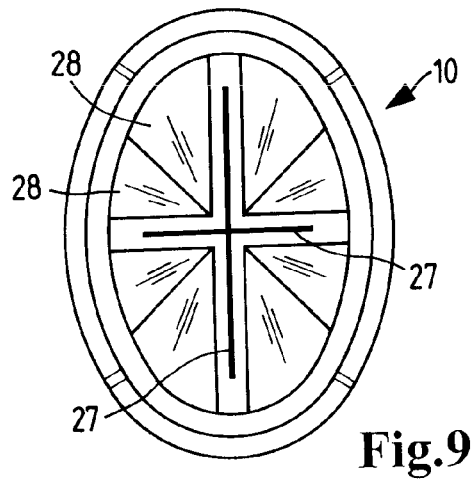

The FIGS. 8 and 9 show an example of an embodiment for an anti-drain valve 10 designed as duck bill valve which is inserted into openings of the cover disk 3 and via which the liquid to be filtered is introduced to the filtering device 1. The duck bill valve 10 is also made completely of plastic. At the off-flow side the duck bill valve 10 features two crosswise arranged flow slits 27 which are opened under normal conditions so that the liquid to be filtered can flow through the duck bill valve 10. Due to the flexibility of the plastic material of the duck bill valve 10 the wall sections 28 of the anti-drain valve which limit the flow slits 27 can be compressed by an externally applied pressure against the wall sections 28 which exceeds a threshold value, thus closing the flow slits 27 and making a through-flow of the liquid via the anti-drain valve 10 impossible. If the external pressure decreases, the internal elasticity of the material of the anti-drain valve 10 opens the flow slits 27 again thus allowing a through-flow through the anti-drain valve.

Figure 10:
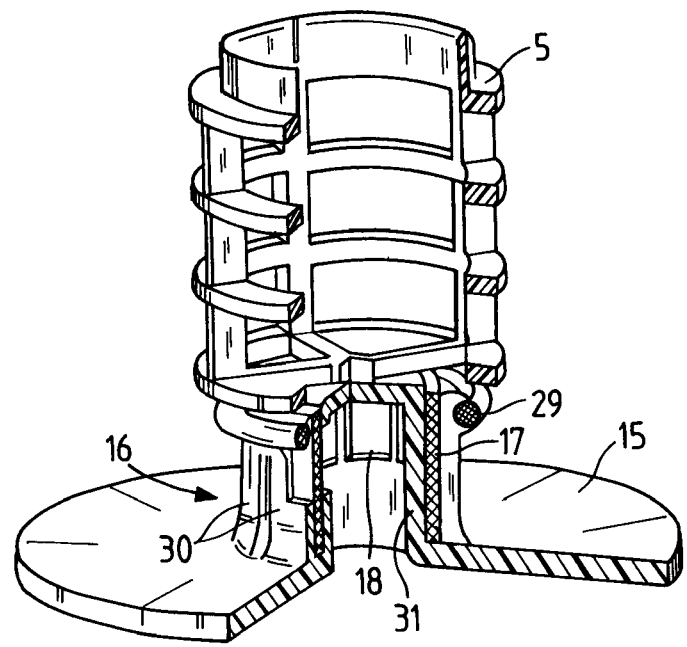
Figure 11:
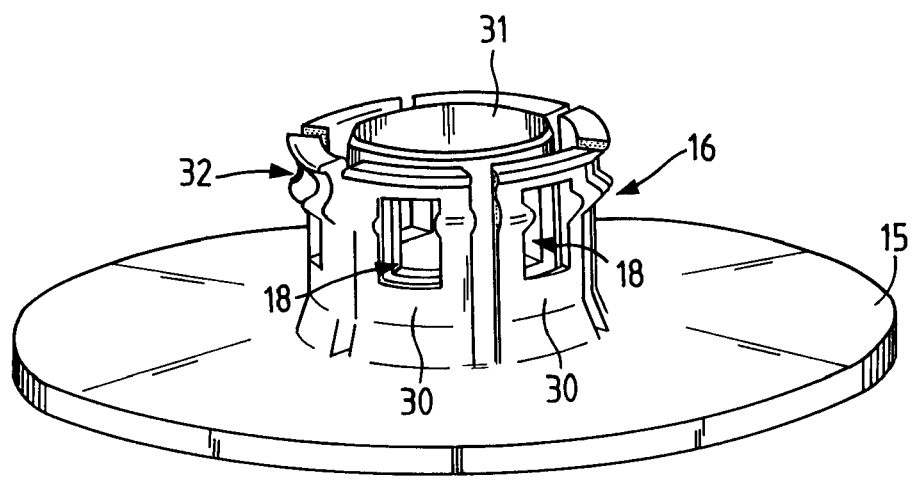
Figure 12:
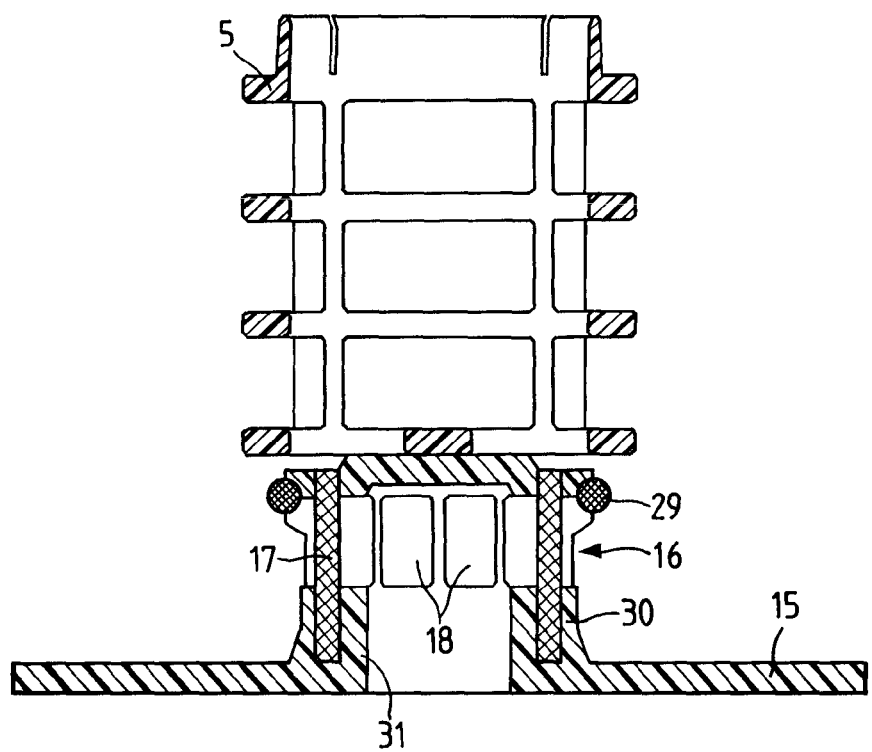

FIGS. 10 to 12 show an example of an embodiment for an overflow valve between entry side and clean side in the lower section near the bottom of the filter element. From the end plate 15 arranged near the bottom of the receptacle of the filter housing 2 arises the central fixing connection 16 around which a cylindrical sealing hose 17 as valve body is placed. The central fixing connection 16 comprises vertically arising wall sections 30 separated from each other which are circularly arranged around a central projection 31. Each of the wall sections 30 is designed as one-piece with the end plate 15 made of plastic and can elastically bounce. This makes it possible to insert a gasket 29 into the circumferential groove 32 which is formed at the outside of the wall sections 30.

The sealing hose 17 forming the valve body is inserted into the space between the central cup-shaped projection 31 and the wall sections 30 enclosing the projection. In doing so, the sealing hose closes the recesses 18 which are realized in the walls of the central projection 31.

The unfiltered liquid at the entry side of the filter element enters from below axially into the interior area of the central projection 31 and exerts a pressure on the sealing hose 17 from inside radially to outside. When exceeding a pressure threshold value at the entry side the sealing hose 17 expands to such an extend that a flow-through connection is realized via the recesses 18 between entry side and clean side so that the unfiltered liquid can immediately flow to the clean side. When the pressure at the entry side decreases the overflow valve closes automatically by compressing the sealing hose.

All components of the overflow valve (with the exception of the sealing hose) are made of plastic which enhances considerably the capability for recycling.

Figure 13A:
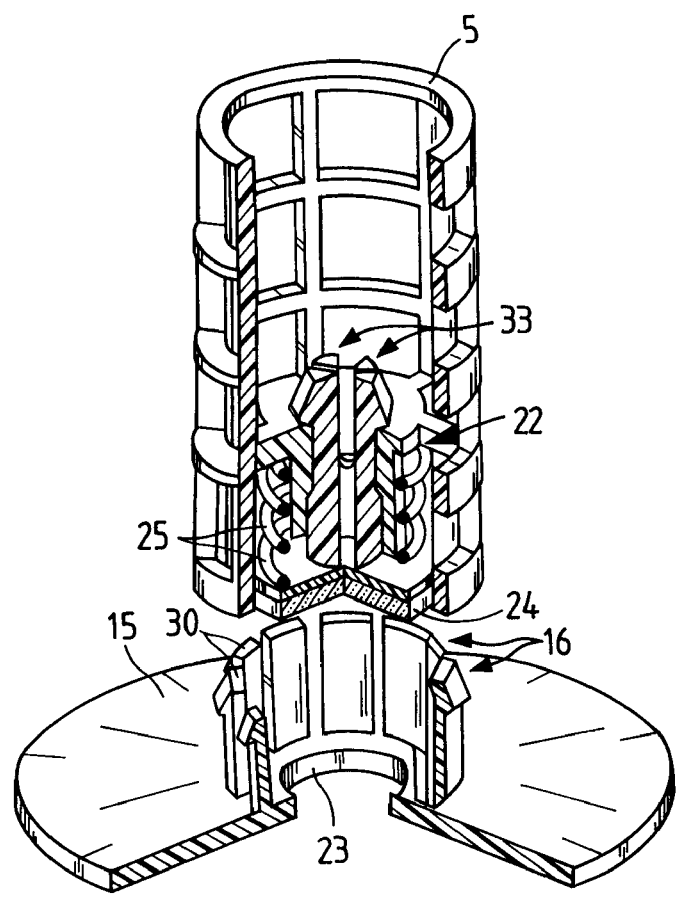

FIG. 13*a* shows an overflow valve 22 in the bottom area of the filter element in another embodiment. In this embodiment, too, all components of the filter element are made of plastic. The valve body of the overflow valve 22 is formed by a sealing washer 24 which is designed as one-piece with snap-in hooks 33 which are fixed loss-proof, however axially displaceable, in the interior area of the supporting element 5 at a locking opening of the supporting element. Thus the sealing washer 24 can be axially shifted between a closing position in which an overflow opening 23 in the end plate 15 at the bottom is closed flow-tight, and an opening position. The sealing washer 24 is subjected to strength by a valve spring 25 in its closing position.

Under regular conditions, the overflow opening 23 which is surrounded by the wall sections 30 of the fixing connection 16, is closed flow-tight by the sealing washer 24.

If the pressure at the entry side exceeds a threshold value, the unfiltered liquid comes from below via the overflow opening 23 in contact with the sealing washer 24 and has an impact on it with an opening pressure against the force of the valve spring 25, by which the sealing washer 24 is lifted up and a flow-through connection between entry side and clean side is realized. When the pressure decreases, the sealing washer 24 can under the impact of the valve spring 25 return to the closing position in which the overflow opening 23 is closed.

Figure 13B:
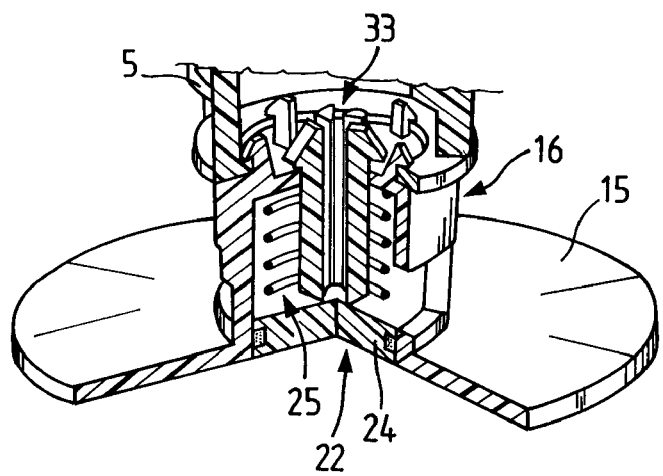
Figure 14A:
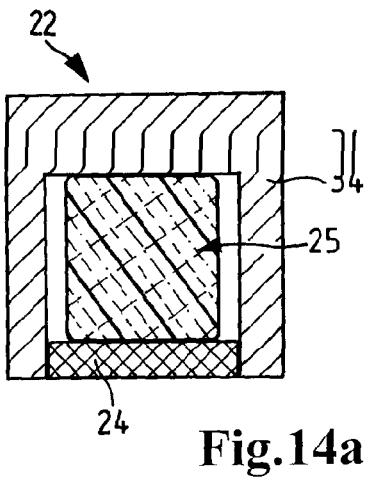
Figure 14B:
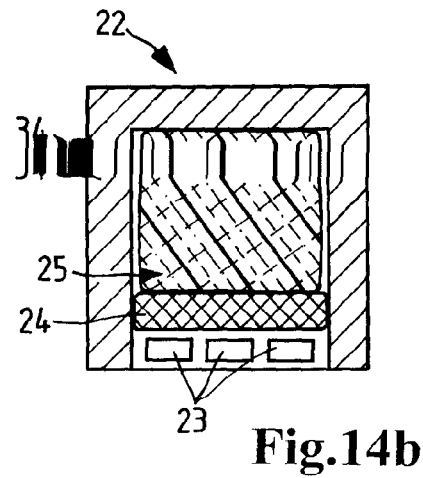
Figure 15A:
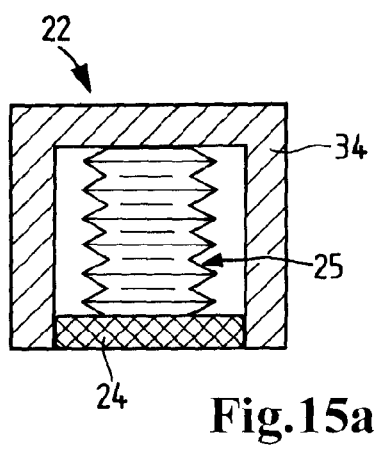
Figure 15B:
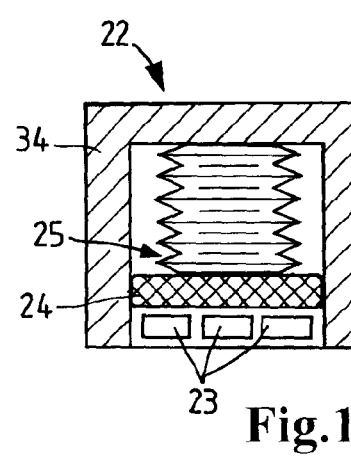
Figure 16A:
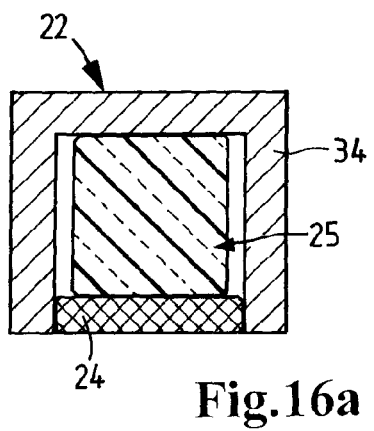
Figure 16B:
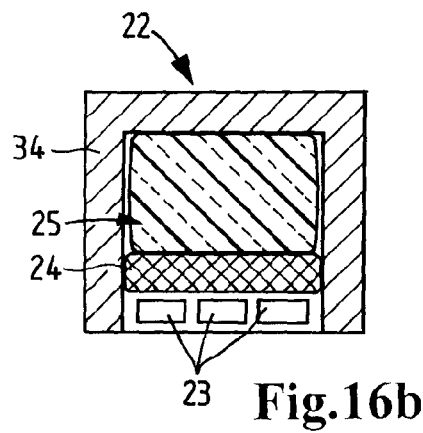

The overflow valve 22 shown in FIG. 13*b* corresponds in its basic structure to that in FIG. 13*a*, however with the difference that the valve spring 25 and the snap-in hooks 33 at the valve body support themselves directly at the fixing connection 16 and not at the supporting element 5 of the filter element. The supporting element 5 is placed on the fixing connection 16 which is conveniently connected in one piece with the end plate 15, it can, however, also form a subassembly that is independent of the end plate 15.

FIG. 14*a* to 16*b* show different examples of embodiments for overflow valves 22 in a simple construction which in closed position separate the entry side from the clean side in the filter element and in open position allow a direct introduction of the unfiltered liquid. In a valve housing 34 is arranged the axially displaceable valve body designed as sealing washer 24 and held in closing position at a valve spring 25. If a force is exerted from outside to the sealing washer 24 against the spring force of the valve spring 25, then the sealing washer 24 is displaced towards the interior area of the valve housing 34 by which overflow openings 23 in the wall of the valve housing 34 are released and a direct flow-through connection is created between entry side and clean side of the filter element. In the three examples of embodiments displayed the valve spring 25 is designed as an elastically bouncing block, wherein in the example according to FIGS. 14*a* and 14*b* the valve spring 25 is designed as an elastomer block, in FIGS. 15*a* and 15*b* as an elastomer bellows and in the example according to FIGS. 16*a* and 16*b* as a foam spring block, consisting of PUR foam or of silicone foam.

FIGS. 17 to 21 show another example of an embodiment for a filtering device for filtering liquids. The filtering device 1 features a cylindrical filter housing 2 in which the ring-shaped filter element 4 is inserted which is radially flown through by the liquid to be filtered. For this purpose, the liquid to be filtered is introduced frontally into the filter housing 2 as shown in FIG. 18. To perform the filtration, the liquid flows through the filter element 4 radially from outside to inside and is then axially discharged via the interior area which represents the clean side out of the filter housing. The filter element 4 features a supporting structure 5 for supporting it. At the axial front end via which the liquid is introduced and/or discharged there are concentrically arranged connecting rings 40 and 41 which separate the clean room from the entry side. The space between the connecting rings 40 and 41 designates the entry side, the interior area within the smaller connecting ring 41 the clean side.

Figure 20:
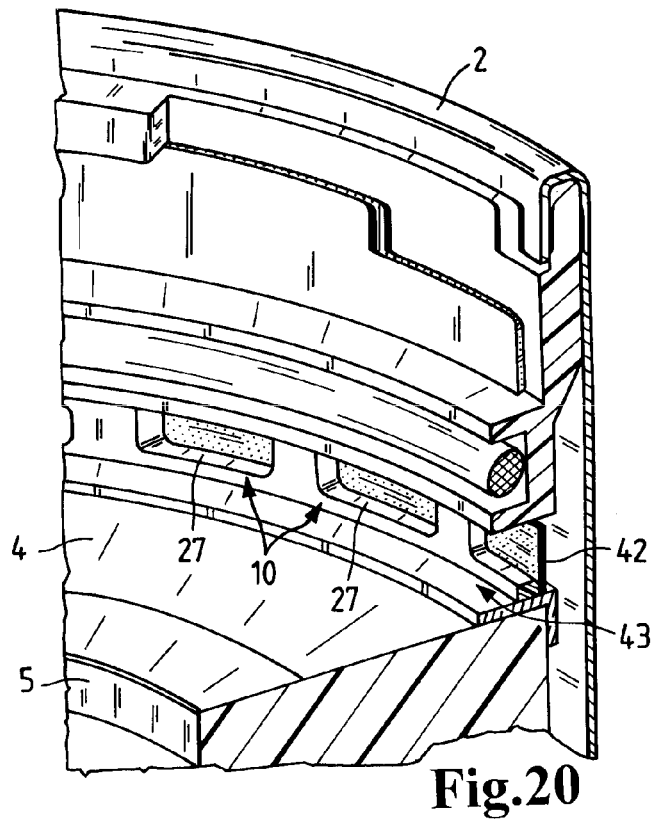
Figure 21:
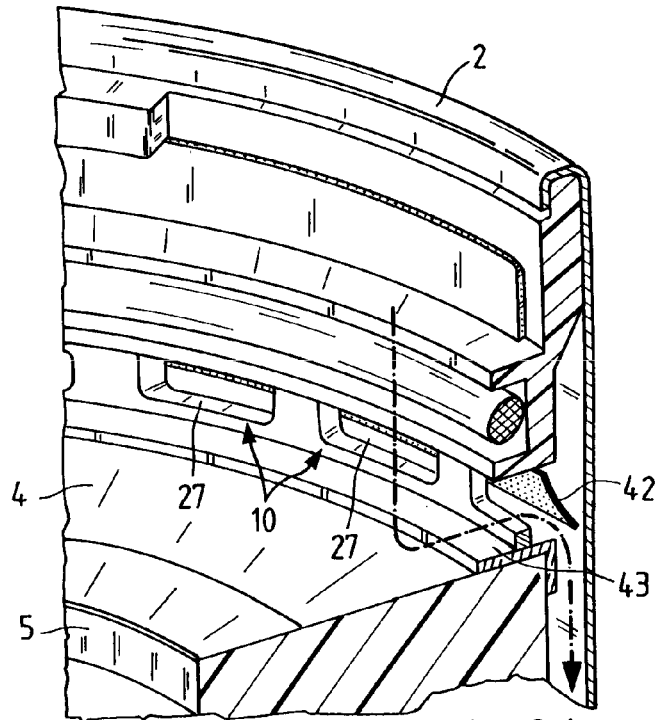

As it can be taken from the detailed drawing in FIGS. 20 and 21, at the axial front end via which the liquid is introduced and/or discharged a radially outer supporting ring 43 is provided for at the filter element 4 into which radial outflow openings 27 are realized which are uniformly arranged over the circumference of the supporting ring. At the radial outside these flow openings 27 are covered by a sealing hose 42 which consists of a flexible elastic material and which is placed under internal stress on the radial outside of the supporting ring 43 in order to cover the flow openings 27. Together with the sealing hose 42 the supporting ring 43 forms an anti-drain valve 10 designed as hose valve which with a corresponding difference in pressure between inside and outside at the sealing hose 42 is transferred into the opening position shown in FIG. 21 where at least sections of the sealing hose 42 are lifted up from the locking position that sealingly abuts the outflow openings 27 so that a flow can radially pass through the outflow openings 27. The pressure applied to the inside of the axially introduced liquid to be filtered lifts the sealing hose 42 radially from the sealing position so that the outflow openings 27 are released. As soon as the differential pressure between inside and outside at the sealing hose falls below a threshold value which is decisively determined by the inner elasticity of the sealing hose, the sealing hose returns to its sealing position by closing the outflow openings.

Figure 22:
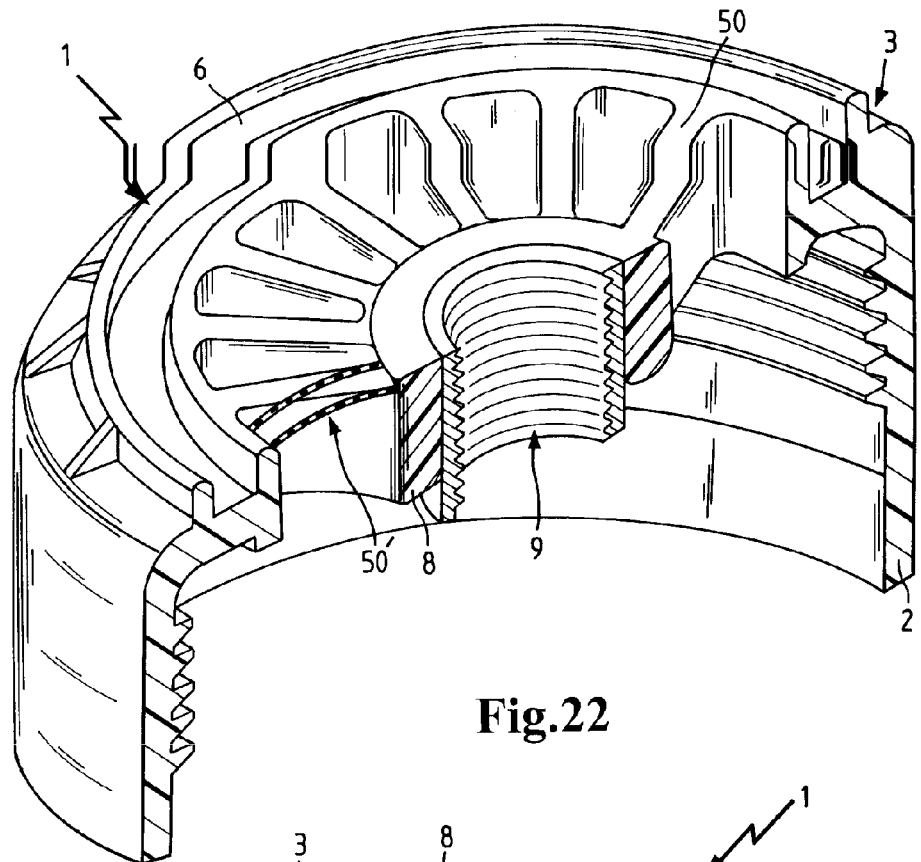

FIG. 22 shows another example of an embodiment of a filtering device 1 for filtering liquids. The cup-shaped filter housing 2 in which the filter element is inserted, is closed frontally by an external cover 6 in which a centric flow connection 8 with female thread 9 is integrated. Between the flow connection 8 and a radial external edge of the individual disk 6 extend radial spokes 50. Intended is a plurality of such spokes which are arranged in regular distance over the circumference of the individual disk 6. The spokes 50 have a straight-line shape and extend conveniently exclusively in radial direction. As shown in the dotted embodiment it may be appropriate to use bent spokes 50' which in addition to the radial component feature also a component in circumferential direction. Furthermore, spokes having a straight-line shape can also run angularly in radial direction.

Figure 23:
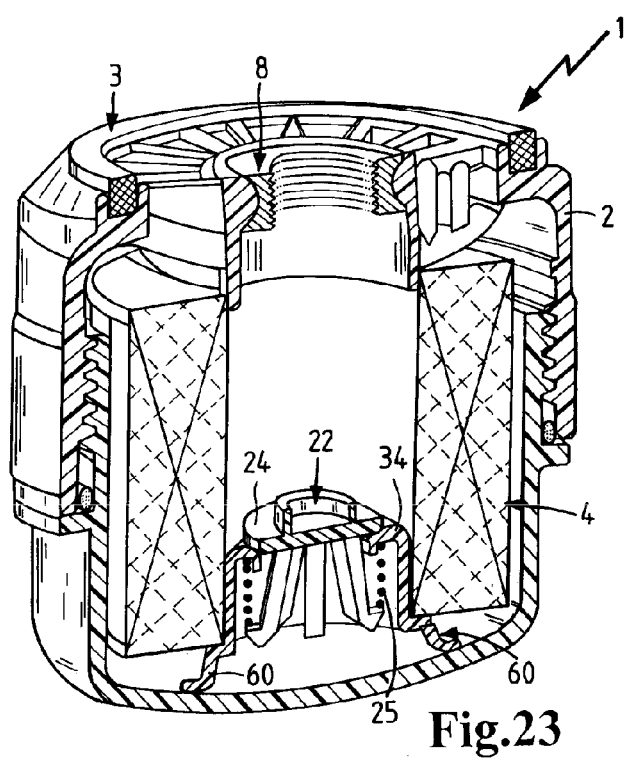
Figure 24:
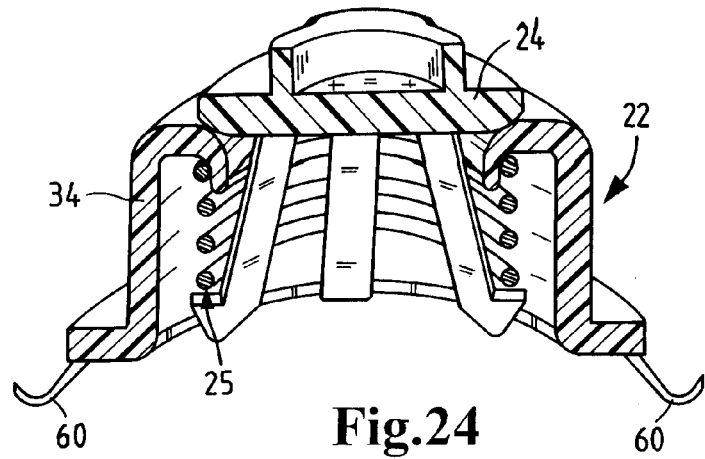
Figure 25:
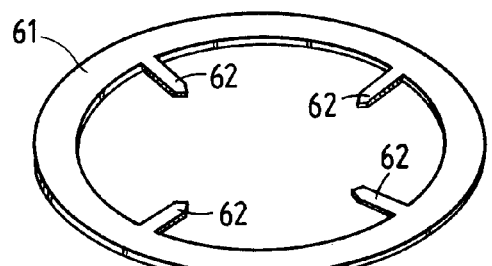

FIGS. 23 to 25 still show another example of an embodiment for a filtering device for filtering liquids. The filter element 4 has a ring-shaped design, the inside representing the clean side and the radial outside the entry side of the filter. In the area of an axial front end of the filter element 4 is arranged an overflow or bypass valve 22 which is conveniently made completely of plastic and features a valve housing 34 which is insertable into the axial interior area of the filter element 4 in the area of the front end. The valve housing 34 contains a valve spring 25 which is designed as spiral spring and exerts especially a compressive force. This valve spring 25 forces a sealing washer 24 serving as valve body into the closing position. If the liquid pressure at the entry side exceeds a threshold value the sealing washer 24 is opened against the force of the valve spring 25 so that a direct through-flow is created between entry side and clean side.

In the area of the axial front end several supporting feet 60 which project above the axial front end of the filter element are arranged which are conveniently designed as one-piece with the valve housing 34. These supporting feet 60 have the function of an elastically bouncing supporting means, allowing an axial tolerance compensation when inserting the filter element 4 into the filter housing 2 and placing it on the bottom of the filter housing. Furthermore, the filter element is centered and guided by means of the supporting feet 60. In addition, it is ensured that the filter element can not be inserted inadvertently wrong.

Conveniently, there are three or four of these supporting feet 60 arranged uniformly over the circumference at the front end of the valve housing 34. As it can be taken from FIG. 25, it may also be appropriate to fix a supporting ring 61 at the axial front end of the valve housing 34 instead of the supporting feet, the supporting ring 61 featuring, however axially displaceable, supporting elements 62 designed as distant and thorn-shaped supporting springs which are radially inwards and axially opposed to the plane of the supporting ring 61.

Figure 26:
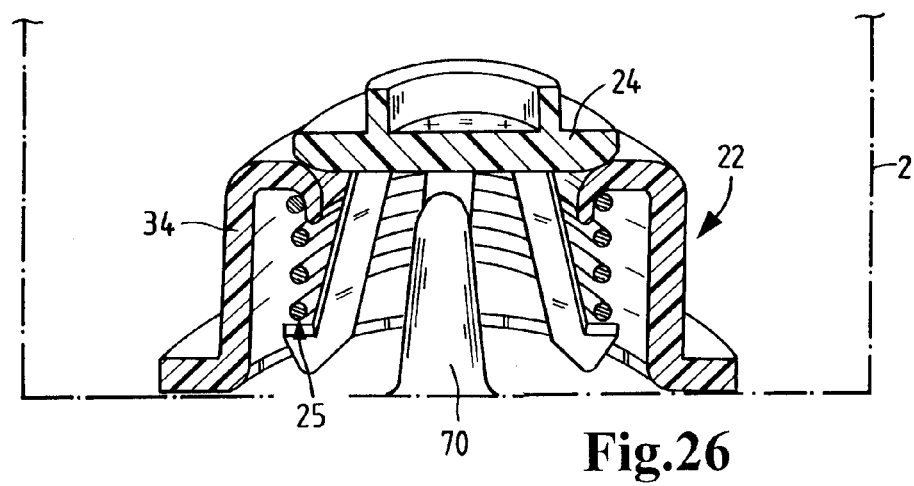

FIG. 26 shows another example of an embodiment in which a bypass valve 22 cooperates with a mandril 70 at the bottom of the cup-shaped filter housing 2. The bypass valve 22 between the entry side and the clean side of the filter element that is to be inserted into the filter housing features a sealing washer 24 forming a valve body which is subjected to strength by a valve spring 25 in its sealing position at the valve housing 34. The valve housing 34 is approximately designed cup-shaped, the open cup side facing the bottom of the filter housing. The sealing washer 24 is distant from the bottom of the filter housing, the lateral walls of the valve housing as well as the sealing washer 24 define a receptacle into which the pin or mandril 70 projects which is firmly fixed to the bottom of the filter housing.

The task of this mandril 70 is to place the valve body of the bypass valve in the opening position in case a wrong filter element including a bypass valve is inserted into the filter housing, so that despite the wrong filter element a direct flow-through connection between entry side and clean side is created, thus ensuring a through-flow of the liquid through the filtering device. In particular, when using it as a fuel filter an emergency supply of the internal combustion engine with fuel is thus guaranteed, even if a wrong filter element is inserted inadvertently.

However, if the filter element and the bypass valve are correctly used the mandril has only a centering function for centering the filter element in the filter cup and not an opening function for the bypass valve. In this case, the mandril projects into the recess in the valve housing 34, however, without having an impact on the sealing washer 24 and without placing it into the opening position. If correctly inserted or if the correct filter element is inserted the sealing washer 24 is placed also in its closing position with sufficient distance to the tip of the mandril.

A further advantage of this mandril is that even if using a filter element intended for this purpose an inadvertent insertion of this filter element in wrong position is prevented. If the filter element is inserted inadvertently wrong into the filter cup, the frontal cover disk at the filter element comes into contact with the mandril 70 so that the filter element is not completely insertable into the filter cup which is immediately perceived during assembly.

FIG. 27 shows a top view of a filter element 4'. The filter element 4' has an upper end plate 15' which is formed of a thermoplastic material. The end plate 15' is basically designed as circular ring disk. Here a centrally arranged opening 81 is provided for through which the liquid can flow. With other embodiments, the end plate 15' can also be designed only as circular disk. The opening 81 for the liquid is then arranged at the opposing side. Besides the circular form or circular ring form it is clear that the end plate 15' can have any other geometric basic shape such as, for example, square, rectangular or polygonal, and in particular hexagonal. The end plate 15' has at its circumference three key structures 80 arranged at the circumference. Here the number and distribution of the key structures 80 at the circumference is arbitrary. That is why only one or more than one key structure 80 can be arranged at the circumference. The key structure 80 projects with its geometry above the external circumference of the end plate 15', the key structure 80 having material bars 82 of different widths or gaps 83.

In this example of an embodiment the key structure 80 has the form of the letters "M+H". It is, of course, possible to combine all letters in any sequence and number to form the key structure 80. Advantageously, the letters are chosen in such a way that they represent, for example, a company logo or an abbreviation of a company or product name. The key structure may, however, also be formed by other characters such as, for example, Japanese or Chinese characters or Arabic or Roman numerals.

FIG. 28 shows a lateral view of the filter element 4'. Components identical with those of FIG. 27 have the same reference signs. The filter element 4 has besides the upper end plate 15' and the lower end plate 15 another zigzag-pleated and ring-shaped closed filter medium 84. The filter medium 84 is sealingly connected with the end plates 15, 15'. In this example of an embodiment, the key structure 80 is inclined towards the surface of the end plate 15' with its area projecting radially above the circular shape of the end plate 15'. Here, the angle of inclination a of the key structure is approx. 45°. However, the angle of inclination a may have any value between 0° and 90°, preferably between 30° and 60°. The key structure 80 engages a lock structure 85 as it is shown in the perspective detail of the filter housing 2' in FIG. 29.

The lock structure 85 is arranged at the cup-shaped filter housing 2 which is appropriate for receiving the filter element 4. In this case, the lock structure 85 has a negative geometry in relation to the key structure 80 so that the material bars 82 of the key structure 80 engage in gaps 83 of the lock structure 85. The material bars 82 of the lock structure 85 engage in gaps 83 of the key structure 80. In this embodiment, the lock structure 85 of the filter housing 2' is designed as notch in the filter housing wall 86. The notches may take the whole material thickness of the filter housing wall 86 or only be a partial recess. In case of a partial recess, part of the filter housing wall 86 remains to which the key geometry 80 is attached. With other embodiments, the lock structure 85 can be arranged at an angle in relation to the filter housing wall 86 and engage the notches in the end plate 15'. Thanks to the interaction of the key-lock structures 80, 85 the structures 80, 85 form one unit. Consequently, the filter element 4' can only be inserted into the filter housing in the correct installation position. The insertion of incorrect filter elements can thus be recognized immediately and avoided if the filter element 4' is not assembled correctly. It is, of course, possible to arrange the key structure 80 at the filter housing 2' if the appropriate lock structure 85 is arranged at the filter element 4'.

Figure 29:
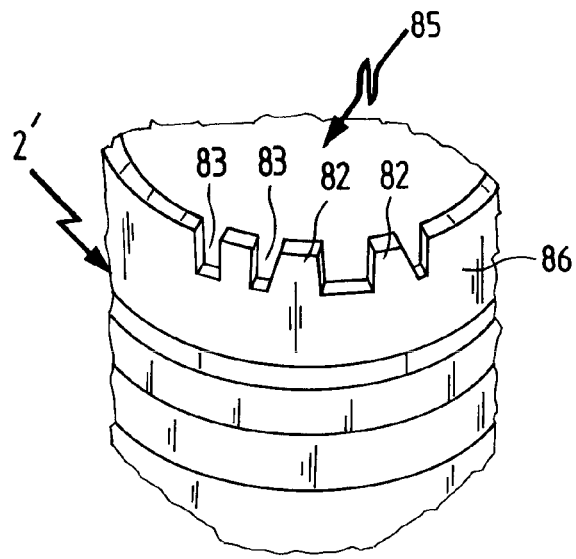
Figure 30:
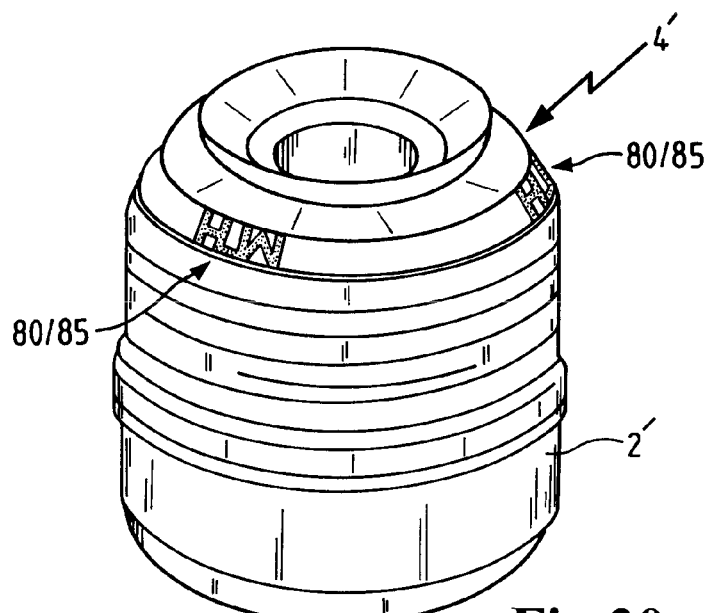

FIG. 30 shows a filter element 4' according to FIG. 28 in assembled state in a filter housing 2' according to FIG. 29. The structures 80, 85 of the filter element 4' and the filter housing 2' complement each other in such a way that the filter element 4' is positioned distort-proof and precisely in the filter housing 2'. This pre-assembled unit consisting of filter element 4' and filter housing 2' can then be screwed into the respective fixing for example at a filter head (not represented) or a cover (not represented). The described key-lock structures 80, 85 can be combined in any way with the above described examples to form embodiments that make sense.

What is claimed is:

1. Filtering device for filtering liquids in internal combustion engines, the filtering device comprising:
    a filter housing;
    a filter element inserted into the filter housing, said filter element having an entry side for unfiltered liquid and a clean side for filtered liquid;
    a cover disk closing off the filter housing;
    wherein the cover disk consists of two individual disks forming an intermediate space therebetween;
    a central hollow flow connection connecting the two individual disks, said central flow connection having a flow opening therethrough, said flow opening in said central flow connection extending through said two individual disks,
    wherein the two individual disks and the flow connection form a common plastic component,
    wherein said two individual disks are arranged in parallel to each other,
    wherein a first one of said two individual disks is a front end disk arranged directly on a front side of said filter element,
    wherein a second one of said two individual disks is axially spaced outwardly away from said filter element and said front end disk, said second disk having flow-through openings extending therethrough communicating fluid flow through said second disk to said entry side of said filter element,
    at least one anti-drain valve that is inserted into said second disk spaced outwardly away from said first end disk and said filter element, said at least one anti-drain valve opening in a direction towards said filter element.

2. Filtering device according to claim 1, wherein
    the cover disk further comprises connecting bars that connect the two individual disk with one another,
    wherein the connecting bars are integral with the cover disk,
    wherein the connecting bars are located radially further outside of said central hollow flow connection.

3. Filtering device according to claim 1, wherein said first individual disk is firmly connected with said front end of the filter element by welding or gluing.

4. Filtering device according to claim 1, wherein the at least one anti-drain valve is a duck bill valve.

5. Filtering device according to claim 1, wherein said first individual disk has flow-through openings designed as slotted holes and extending in a circumferential direction of said first individual disk.

6. Filtering device according to claim 1,
    wherein the front disk has an overflow opening between an entry side and a clean side of the filter element, said filtering device further comprising
    an overflow valve closing the overflow opening,
    wherein the overflow valve is put into an opening position when a pressure at the entry side exceeds a threshold value.

7. Filtering device according to claim 1, wherein the central flow connection has a female thread.

8. Filtering device according to claim 7, wherein the female thread has an elliptic geometry.

9. Filtering device according to claim 1, wherein the filter element is of a hollow cylindrical shape and flow through the filter element is in a radial direction, wherein the central flow connection communicates with an interior area of the filter element.

10. Filtering device according to claim 9, wherein
    between the entry side and the clean side an overflow valve is arranged which is put into an opening position when the pressure of a liquid being filtered by the filter element exceeds a threshold value at the entry side of the filter element.

11. Filtering device according to claim 10, wherein
    a valve body of the overflow valve is a sealing hose placed onto a cylindrical supporting body between the entry side and the clean side,
    wherein the cylindrical supporting body has flow openings and
    wherein the sealing hose is arranged at the clean side of the cylindrical supporting body.

12. Filtering device according to claim 10, wherein
    the overflow valve comprises an adjustable valve body and a valve seat into which valve seat the valve body is pushed by a valve spring of the overflow valve,
    wherein the valve body and the valve spring are made of plastic.

13. Filtering device according to claim 12, wherein
    the valve spring is designed as an elastically bouncing block designed as an elastomer block;
    an elastomer bellows;
    or a foam spring block consisting of PUR foam or silicone foam.

14. Filtering device for filtering liquids in internal combustion engines, the filtering device comprising:
    a filter housing;
    a filter element inserted into the filter housing, said filter element having an entry side for unfiltered liquid and a clean side for filtered liquid;
    a cover disk closing off the filter housing;
    wherein the cover disk consists of two individual disks forming an intermediate space therebetween;
    a central hollow flow connection connecting the two individual disks, said central flow connection having a flow opening therethrough, said flow opening in said central flow connection extending through said two individual disks, wherein the two individual disks and the flow connection form a common plastic component, wherein said two individual disks are arranged in parallel to each other, wherein a first one of said two individual disks is a front end disk arranged directly on a front side of said filter element, wherein a second one of said two individual disks is axially spaced outwardly away from said filter element and said front end disk, said second disk having flow-through openings extending therethrough communicating fluid flow through said second disk to said entry side of said filter element, wherein a first one of the individual disks comprises a multitude of spokes extending from the central flow connection radially outwardly.

15. Filtering device according to claim 14, wherein the spokes describe a curved path in a plane of said first individual disk and have, in addition to a radial component, a component in a circumferential direction of said first individual disk.

* * * * *